UNITED STATES PATENT OFFICE.

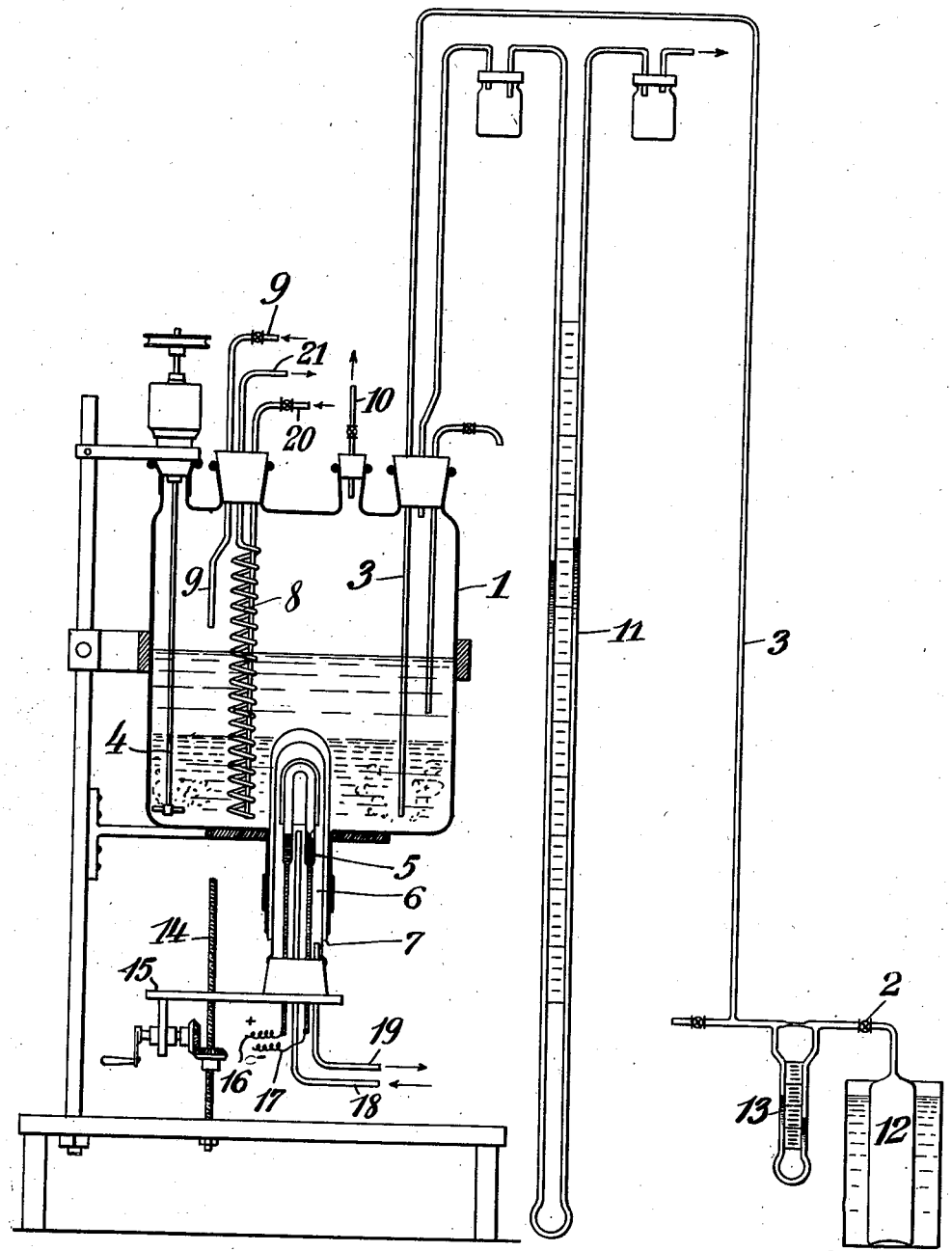

BURRITT S. LACY, OF SEWAREN, NEW JERSEY, ASSIGNOR TO THE ROESSLER & HASSLACHER CHEMICAL COMPANY, OF NEW YORK, N. Y., A CORPORATION OF NEW YORK.

PROCESS OF PHOTOCHEMICAL CHLORINATION.

1,308,760.   Specification of Letters Patent.   Patented July 8, 1919.

Application filed April 19, 1917. Serial No. 163,228.

*To all whom it may concern:*

Be it known that I, BURRITT S. LACY, a citizen of the United States of America, and a resident of Sewaren, county of Middlesex, State of New Jersey, have invented certain new and useful Improvements in Processes of Photochemical Chlorination, of which the following is a specification.

The invention relates to the chlorination of organic substances under the influence of light, and the object of the invention is to simplify the operation and to prevent the losses of material which tend to occur according to the methods hitherto used.

The methods of photochemical chlorination of substances are ordinarily carried on either in the vapor or in the liquid phase; my new process belongs to this latter type, and for the better understanding of it I shall describe my invention by way of example, as applied to the chlorination of methylene chlorid, though it may equally well be applied to the chlorination of many other organic liquids, such as for example, pentane, benzol, toluol and many other similar hydrocarbons.

The course of reaction depends largely on the proportion of chlorin admitted to a given quantity of hydrocarbon; if the reaction in the example given is desired to go on essentially according to the equation

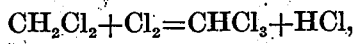

$$CH_2Cl_2 + Cl_2 = CHCl_3 + HCl,$$

I usually prefer to admit to a given quantity of hydrocarbon a quantity of chlorin not far from the theoretical amount according to the above equation, though in any case the $CHCl_3$ produced tends to some extent to be further chlorinated to $CCl_4$ leaving some unreacted $CH_2Cl_2$.

I shall describe my invention as carried on in connection with the apparatus shown in the accompanying drawing, which shows somewhat diagrammatically a suitable type of apparatus which may be employed in the operation of my process. Specifically, and by way of example, I shall describe how I proceed in the production of chloroform from methylene chlorid and chlorin.

Suitable amounts of methylne chlorid and chlorin and water are charged into the reaction vessel 1, which latter may be constructed of a material which like enameled steel or stoneware is resistant to the action of chlorin and hydrochloric acid.

After now flushing out the air from above the liquid, which may be accomplished by means of a current of chlorin gas passed in through pipe 9, and out through pipe 10, chlorin is passed into the methylene chlorid from a suitable container 12 through the valve 2 and the pipe 3. (13 indicates a suitable flow gage for indicating the rate of admission of the chlorin.) Most of the chlorin dissolves in the methylene chlorid, but enough usually passes through the latter and accumulates in the gas space above the water layer to begin to raise the pressure inside the vessel. By means, however, of the centrifugal stirrer 4, operated in any suitable manner, the chlorin is continuously sucked down from the gas space above the water layer back into the methylene chlorid, so that the tendency of the pressure to rise is in this way counterbalanced. It is in fact an easy matter to maintain the pressure in the reaction vessel exactly at the desired point (namely atmospheric pressure or slightly above it) by means of regulating the rate of admission of chlorin through the valve 2; if this is opened too wide, the pressure rises above, and if not wide enough the pressure falls below atmospheric pressure, as indicated by the gage 11, which latter may be filled with concentrated sulfuric acid as shown.

Meanwhile as the chlorin dissolves it is in turn continuously reacting with the methylene chlorid, under the influence of the light from the mercury vapor quartz lamp 5, which with its glass or fused silica water jacket 6 may be moved up and down in the glass or fused silica bulb tube 7, which by means of cementing or of rubber tubing so as to make a gas tight joint, is fitted into the bottom of the reaction vessel. The lamp 5 may be moved up and down by any suitable means as by screw shaft 14 screw threaded to arm 15 carrying the lamp. The electric terminals for the lamp are shown at 16 and 17 and the connections for the water jacket at 18 and 19 respectively. The centrifugal stirrer 4 serves to circulate the contents of the vessel against the cooling coil 8, supplied with water or other cooling liquid through connections 20 and 21, by means of which the heat developed by the chemical reaction and by the dissolving of the HCl is absorbed. This coil may be made of a material which like stoneware, enameled steel, silver or lead, is resistant to the action of chlorin and hydrochloric acid, or the reaction vessel itself may be of the jacketed type, and the cooling medium passed between the inner and outer walls of the jacket in the well known way. The cooling is regulated to maintain the temperature at a convenient point, for example about 10° to 30° C.

When sufficient chlorin has been passed in, the inlet valve 2 is closed, the vessel is opened to the air, for example by opening air vent 10, and the lamp allowed to run until there is no more chlorin left in the solution.

The contents of the reaction vessel are then drawn off, the two layers separated, and the crude product, which may be predominantly chloroform or predominantly carbon tetrachlorid, depending on how much chlorin is used, purified in the usual manner; any unused methylene chlorid may be separated by distillation and again subjected to chlorination, while the acid solution which is obtained may contain 30% by weight of hydrochloric acid or even more.

From this description of my new invention, it is obvious that it solves easily and conveniently the many difficulties arising from the complicated nature of the chemical reaction and the physical phenomena; for instance the solution of the chlorin in the organic liquid, the action of the chlorin on the organic liquid, and the absorption in the water of the HCl produced, go on simultaneously in the reaction vessel, thus not only attaining extreme compactness and simplicity of operation, but also entirely avoiding the loss of volatile products which is likely to occur when the HCl is led off into a separate absorption system.

There are of course many possible variations in the details of carrying out my invention and the practice of my process is not to be restricted to any of such details as shown or described. For example, instead of or in addition to using a vertical centrifugal stirrer of the type shown in the drawing, any other suitable means of accomplishing the purpose of continuously removing chlorin from the gas space by dissolving the same in the liquid or otherwise may be used at the same time circulating the liquid against the cooling surface to keep the temperature at the above-mentioned range, which is usually not far from the ordinary room temperature, but always is below the boiling point of the non-aqueous layer, i. e., of the hydrocarbon or chloro-hydrocarbon, to be treated. Again, in the chlorination of a liquid which like pentane, is lighter than water, the illumination by means of the chemically active light, is of course directed toward the upper layer, while the hydrochloric acid produced must be dissolved in the lower layer by means of the centrifugal stirrer or other suitable means.

The apparatus shown and described herein is therefore only illustrative of what may be used in carrying out my process which of course may be carried out by any other suitable arrangement of apparatus designed to perform the requisite functions.

Such arrangements of apparatus are within the skill of those skilled in the art and do not affect the essential principles of my invention, I therefore do not limit myself to the particular method of carrying out the principles which I have described, by way of example, in the foregoing specification further than the scope of the appended claims demands.

I claim:

1. The process of preparing chlorinated hydrocarbons which comprises simultaneously dissolving chlorin in an organic liquid containing replaceable hydrogen and adjacent to a layer of water, acting on the solution thus obtained with chemically active light, and absorbing the generated hydrochloric acid in the said layer of water.

2. The process of preparing chlorinated hydrocarbons which comprises simultaneously dissolving chlorin in an organic liquid containing replaceable hydrogen and adjacent to a layer of water, acting on the solution thus obtained with chemically active light, absorbing the generated hydrochloric acid in the said layer of water, and maintaining the temperature below the boiling point of the non-aqueous layer.

3. The process of preparing chlorinated hydrocarbons, which comprises simultaneously dissolving chlorin in an organic liquid containing replaceable hydrogen and adjacent to a layer of water, acting on the solution thus obtained with chemically active light, absorbing the generated hydrochloric acid in the said layer of water, maintaining the temperature below the boiling point of the non-aqueous layer and maintaining the pressure at approximately atmospheric pressure by regulating the rate of admission of the chlorin.

4. The process of preparing chloroform and carbon-tetrachlorid, which comprises simultaneously dissolving chlorin in methylene chlorid adjacent to a layer of water, acting on the solution thus obtained with chemically active light, absorbing the generated hydrochloric acid in the said layer of water and maintaining a temperature in the reaction vessel of approximately 10° to 30° C.

5. The process of preparing chloroform and carbon-tetrachlorid, which comprises simultaneously disssolving chlorin in methylene chlorid adjacent to a layer of water acting on the solution thus obtained with chemically active light, absorbing the generated hydrochloric acid in the said layer of water, maintaining a temperature in the reaction vessel of approximately 10° to 30° C., and maintaining the pressure at approximately atmospheric pressure by regulating the rate of admission of the chlorin.

In testimony whereof I have signed this specification.

BURRITT S. LACY.